July 4, 1967 G. F. ANDERSON 3,329,843
LAMINATED ROTOR MEMBER FOR DYNAMOELECTRIC MACHINE
OF AXIAL AIR GAP TYPE
Filed May 18, 1964 2 Sheets-Sheet 1
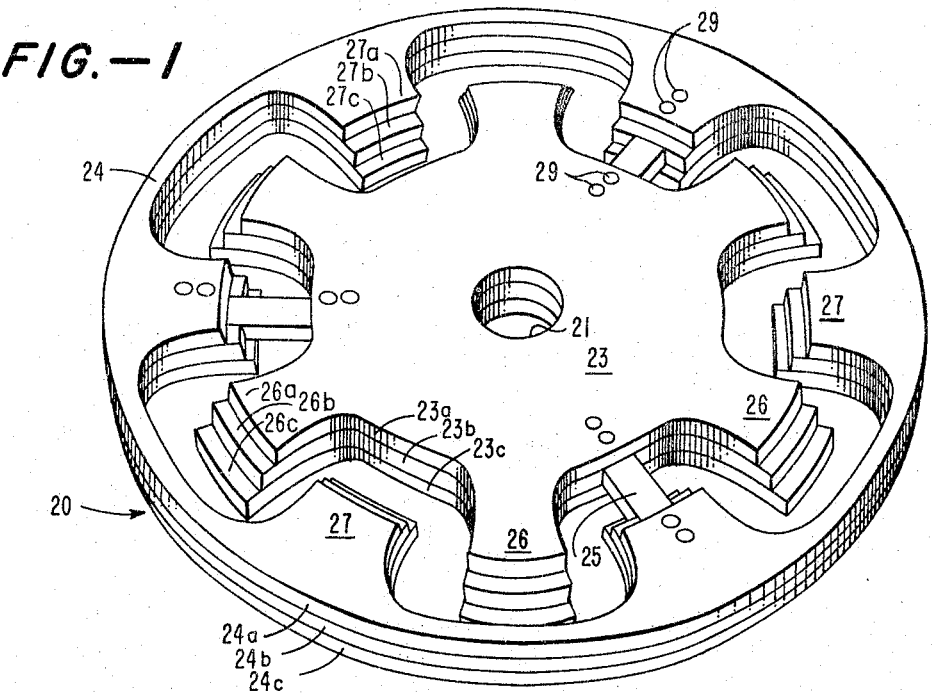
FIG.-1
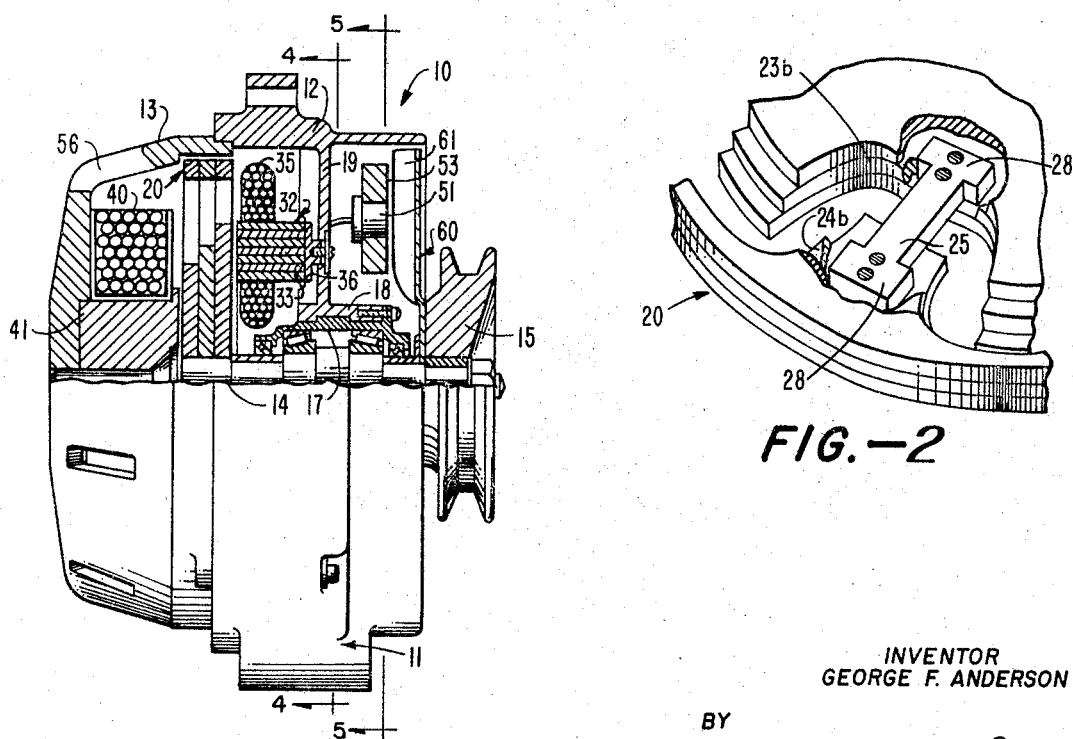
FIG.-2
FIG.-3
INVENTOR
GEORGE F. ANDERSON
BY
*Edward O. Ansell*
*William E. Hiller*
ATTORNEYS July 4, 1967
G. F. ANDERSON
3,329,843
LAMINATED ROTOR MEMBER FOR DYNAMOELECTRIC MACHINE
OF AXIAL AIR GAP TYPE
Filed May 18, 1964
2 Sheets-Sheet 2
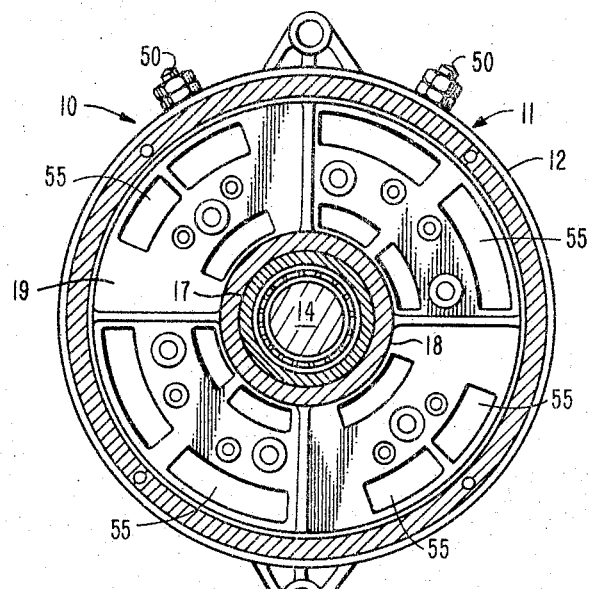
FIG.—4
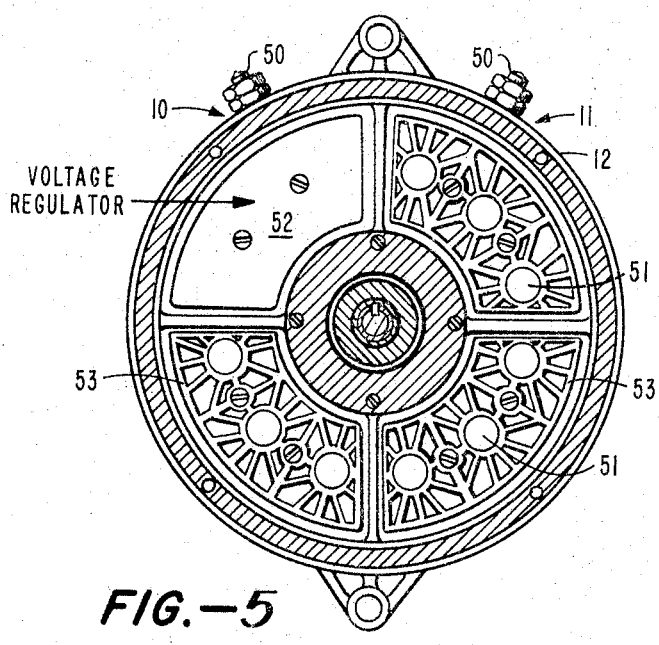
FIG.—5
INVENTOR
GEORGE F. ANDERSON
BY
Edward O. Ansell
William E. Hiller
ATTORNEYS

United States Patent Office 3,329,843
Patented July 4, 1967

3,329,843
LAMINATED ROTOR MEMBER FOR DYNAMO-ELECTRIC MACHINE OF AXIAL AIR GAP TYPE
George F. Anderson, Buena Park, Calif., assignor to Aerojet-General Corporation, Azusa, Calif., a corporation of Ohio
Filed May 18, 1964, Ser. No. 368,045
1 Claim. (Cl. 310—168)

This invention generally relates to a dynamoelectric machine of the electromagnetic induction type, and more particularly to an improved brushless alternator especially suitable for use in vehicles of general character, such as automobiles, aircraft, boats, as a source of electric power, the alternator utilizing a rotor member of novel construction which requires no coil windings and eliminates the necessity for slip rings, brushes, and brush rigging in the alternator.

Typically, an alternator comprises a stator member and a rotor member mounted on a rotatable shaft for rotation therewith with respect to the stator member, wherein the rotor member is equipped with coil windings requiring slip rings and brushes for providing the magnetic flux necessary to produce electric power. Alternators of this general character are usually subject to relatively frequent maintenance because of the number of parts associated therewith, such as slip rings, brushes, and brush holders, likely to require replacement or repair.

In copending U.S. patent application, Ser. No. 56,080 filed Aug. 12, 1960, now U.S. Patent 3,261,998 issued July 19, 1966, there is disclosed an alternator of the so-called brushless type wherein no slip rings or brushes are required and the rotor member is not provided with windings. The brushless alternator disclosed in the aforesaid copending U.S. patent application features an axial air gap between a rotor member and the stator armature, the axial gap being provided by forming the rotor member as a disc having a radial face axially spaced from an opposed face of the stator core which is provided with an armature winding.

It is an object of the present invention to provide an improved brushless alternator of the same general type disclosed in copending application, Ser. No. 56,080 filed Aug. 12, 1960, now U.S. Patent 3,261,998 issued July 19, 1966, which includes a unitary rotor member of laminated construction, the rotor member being of magnetic material and comprising a plurality of spaced magnetic poles alternately extending radially outwardly and inwardly with the outwardly extending poles being of one magnetic polarity and the inwardly extending poles being of the opposite magnetic polarity.

It is another object of this invention to provide a novel rotor member of unitary laminated construction for use in a dynamoelectric machine, wherein the rotor member includes an inner disc of magnetic material having circumferentially spaced radially outwardly extending magnetic poles of one magnetic polarity projecting therefrom and an outer annular rim of magnetic material extending about the disc, the rim having spaced radially inwardly extending magnetic poles of the opposite magnetic polarity projecting therefrom and respectively interfitting between adjacent radially outwardly extending poles on the disc in spaced relation, with the disc and the rim respectively comprising a plurality of laminations and being connected in radially spaced relationship by non-magnetic spacer means extending therebetween.

It is another object of this invention to provide a novel rotor member of the type described for use in a dynamoelectric machine, wherein the rotor member is of unitary laminated construction and comprises a plurality of laminations for the inner disc and outer annular rim of the rotor member with the laminar portions forming the respective magnetic poles projecting from the disc and the rim being progressively stepped in radial length to minimize magnetic leakage between poles of unlike polarity by reducing the effective area of unlike poles in juxtaposition to each other while increasing the effective distance therebetween.

The laminated rotor member in accordance with the present invention permits significant manufacturing economies in producing the brushless alternator because of its unique unitary construction which does not require windings. The laminated form of the rotor member further contributes to lowered manufacturing costs by providing a reliable construction of the rotor member which does not involve the relatively higher costs implicit in the manufacture of a rotor member by forging, casting, or one-piece stamping.

Some of the objects of the invention having been stated, other objects will become apparent as the specification proceeds when taken together with the accompanying drawings, in which:

FIG. 1 is an enlarged perspective view of a laminated rotor member constructed in accordance with the present invention;

FIG. 2 is a fragmentary perspective view of the laminated rotor member shown in FIG. 1, and partially broken away to illustrate the details of a spacer member connecting the inner disc and the outer annular rim of the rotor member together;

FIG. 3 is a longitudinal sectional view of a brushless alternator, partially shown in elevation, showing the laminated rotor member of FIG. 1 as a component thereof;

FIG. 4 is a transverse sectional view taken along the line 4—4 in FIG. 3; and

FIG. 5 is a transverse sectional view taken along the line 5—5 in FIG. 3.

Referring more specifically to the drawings, there is shown a dynamoelectric machine in the form of a brushless alternator which is broadly identified by the reference numeral 10. In accordance with the present invention, the alternator 10 is particularly suitable for use in vehicles, such as automobiles, aircraft, boats, to provide a source of electric power. The alternator 10 comprises a housing 11 which may be formed by a pair of housing sections 12, 13 suitably secured together. For reasons which will appear hereinafter, the housing section 13 is made of magnetic material, while the housing section 12 is made of non-magnetic material. A cylindrical shaft 14 is received in the housing 11 and extends outwardly thereof beyond the housing section 12. A sheave or pulley 15 may be fixedly mounted on the end of the shaft 14 disposed outwardly of the housing 11. In this connection, the end of the shaft 14 receiving the sheave 15 may be provided with axially extending splines (not shown) for keying the sheave 15 in fixedly secured relation to the shaft 14. The sheave 15 is adapted to have a belt (not shown) entrained thereabout for being driven to impart rotation to the shaft 14. The belt referred to may be the fan belt entrained about the water pump shaft and driven by the crankshaft of a vehicle, for example.

The shaft 14 is supported for rotation within the housing 11 by a bearing assembly 17 which is mounted within the housing section 12, the bearing assembly 17 being carried by an annular hub 18 forming the inner end of a radial partition or wall 19 integral with the housing section 12 and extending inwardly thereof.

The rotatable shaft 14 carries a rotor member 20 thereon within the housing 11, the rotor member being fixedly secured to the shaft 14 for rotation therewith. To this end, the rotor member 20 has a central bore 21 for snugly receiving the shaft 14, and suitable means are provided to prevent relative rotation between the rotor member 20 and the shaft 14. For example, such means may comprise an axial key (not shown) secured to the inner periphery of the rotor member 20 bounding the bore 21 and a complementary slot (not shown) formed in the shaft 14 in which the key is received.

In accordance with the present invention, the rotor member 20 is of unitary construction and comprises an inner metallic disc 23, an outer annular metallic rim 24, and spacer means in the form of a plurality of metallic spacer members 25 extending between the disc 23 and the rim 24 to connect the disc 23 and the rim 24 together in radially spaced relationship. The disc 23 is made of a magnetic metal material and is provided with a plurality of cricumferentially spaced radially outwardly extending projections 26 which comprise magnetic poles of the same given magnetic polarity. The annular rim 24 is also made of a magnetic metal material and is provided with a plurality of arcuately spaced radially inwardly extending projections 27 which comprise magnetic poles of like magnetic polarity, but opposite from the polarity of the poles 26 on the disc 23. The poles 26 on the disc 23 and the poles 27 on the annular rim 24 alternate in sequence, such that respective poles 27 on the annular rim 24 are interposed between adjacent poles 26 on the disc 23 in arcuately spaced relation thereto, and vice versa.

The spacer members 25 are made of a non-magnetic metal material. Each of the spacer members 25 comprises a flat elongate bar. The radially outwardly disposed end of the bar 25 is received within a complementary recess formed in one of the radially inwardly extending projections or magnetic poles 27 on the annular rim 24 and is suitably fixedly secured to the projection 27 on the annular rim 24. Similarly, the radially inwardly disposed end of the bar 25 is received within a complementary recess formed in the disc 23 at a location thereon between adjacent radially outwardly extending projections or magnetic poles 26 on the disc 23 and is suitably fixedly secured to the disc 23.

Magnetic leakage between the inner poles 26 on the disc 23 and the outer poles 27 on the annular rim 24 of the rotor member 20 is held to a minimum by providing for an effective reduction in the surface areas of poles 26, 27 of unlike magnetic polarity facing each other while increasing the effective distance between such poles 26, 27 of unlike polarity.

The rotor member 20 in accordance with the present invention is of laminated construction and comprises an inner metallic disc 23 and an outer annular metallic rim 24—each of which is formed from a plurality of laminations of sheet metal suitably secured together. Thus, the inner disc 23 comprises metallic laminations 23a, 23b, and 23c, while the outer annular rim comprises metallic laminations 24a, 24b, and 24c. Each of the spacer members 25 comprises a flat elongate bar having flanged ends 28, 28, as shown in FIG. 2. The center laminations 23b and 24b of the disc 23 and the annular rim 24 are provided with complementary notches to respectively receive the flanged ends 28, 28 of each of the spacer members 25. The notches provided in the center laminations 23b and 24b are covered by the outer laminations 23a, 23c and 24a, 24c of the disc 23 and annular rim 24, respectively, to define the recesses in which the opposite ends of the spacer members 25 are received, as previously described.

Suitable fastener means, such as rivets 29, secure the spacer members 25 in place. Thus, the rivets 29 may be driven in place after the laminations 23a, 23b, and 23c forming the disc 23 and the laminations 24a, 24b, and 24c forming the annular rim 24 have been properly assembled with the spacer members 25—the rivets 29 respectively extending through the opposite flanged ends 28, 28 of each of the spacer members 25 and the outer laminations 23a, 23c and 24a, 24c of the disc 23 and the annular rim 24 to serve the purpose of fixedly securing the spacer members 25 in place, while also respectively fixedly securing the laminations comprising the disc 23 and the annular rim 24 in assembled relation.

In the laminated rotor member 20 of FIGS. 1 and 2, magnetic leakage between the inner poles 26 on the disc 23 and the outer poles 27 on the annular rim 24 is minimized by making the laminar portions 26a, 26b, and 26c forming the respective inner poles 26 and the laminar portions 27a, 27b, and 27c forming the respective outer poles 27 of progressively stepped radial length. Thus, laminar portion 26b extends radially outwardly beyond laminar portion 26a, and laminar portion 26c extends radially outwardly beyond laminar portion 26b for each of the inner poles 26, while laminar portion 27b extends radially inwardly beyond laminar portion 27a, and laminar portion 27c extends radially inwardly beyond laminar portion 27b for each of the outer poles 27. While the laminated rotor member 20 of FIGS. 1 and 2 has been shown and described as having a disc 23 and an annular rim 24 respectively formed of three laminations of sheet metal, it will be understood that this is by way of an illustrative example only.

A stator member 32 is mounted within the housing 11, the stator member 32 being contained within the non-magnetic housing section 12 and being disposed in axially spaced relation to the opposed radial face of the rotor member 20 to define an axial air gap therebetween. The stator member 32 comprises an annular armature or core 33 of magnetic material, such as iron. The stator armature 33 may be formed of strip material tightly wound to provide spiral convolutions wherein the respective convolutions constitute laminations. The stator armature 33 is provided with a plurality of circumferentially spaced radial slots in the radial face thereof opposed to the rotor member 20, the slots receiving stator windings 35 therein to assist in supporting the windings 35 on the stator armature 33. The windings 35 are arranged and distributed about the stator armature 33 in a predetermined manner depending upon the character of the electromotive force which is desired to be produced by the alternator 10. Various forms of known windings for armatures may be suitably employed.

The stator member 32 is carried by the housing 11, being supported by the radial partition 19 of the housing section 12. In this respect, the stator armature 33 is secured to the partition 19 by a plurality of arcuately spaced mounting brackets 36 of non-magnetic material which are affixed to the radial face of the stator armature 33 remote from the rotor member 20 and fastened to the partition 19 by suitable means, such as screws.

Means are provided for creating a magnetic field in the housing 11 in the region of the rotor member 20. To this end, a field winding or field coil 40 is wound about a field armature or field iron 41 which is carried by the housing section 13 of magnetic material in opposed relation to the radial face of the rotor member 20 opposite from the stator member 32. The field coil 40 and the field iron 41 are thereby arranged in axially spaced relation to the opposed radial face of the rotor member 20 to define an axial air gap therebetween. Upon exciting the field coil 40 by connecting the field coil 40 to a source of direct current, such as for example an automobile battery (not shown), to electrically energize the field coil 40, a magnetic flux is created. The magnetic flux flows from the field iron 41 across one axial air gap to the inner poles 26 on the disc 23 of the rotor member 20, across the other axial air gap into the stator armature 33, around the annular stator armature 33 and back across the other axial air gap to the outer poles 27 on the annular rim 24 of the rotor member 20, to the periphery of the annular rim 24 and radially outwardly across a radial air gap between the rotor member 20 and the magnetic housing section 13 to the housing section 13, and inwardly through the housing section 13 to return to the field iron 41 in completing the magnetic circuit.

The rotation of the shaft 14 as driven by the sheave 15 and the corresponding rotation of the rotor member 20 carried by the shaft 14 while the field coil 40 is being excited by the application of direct current thereto, causes an electromotive force in the form of alternating voltage to be generated in the windings 35 on the stator armature 33. In this respect, it will be understood that the rotation of the rotor member 20 causes the groups of poles 26 and 27 of unlike magnetic polarity to be moved across the opposed annular radial face of the stator armature 33 so that the magnetic flux cuts through the windings 35 on the stator armature 33 to generate alternating voltage in the windings 35.

The alternating voltage so generated can then be utilized as a source of electric power by connecting the leads of the stator windings 35 to output terminals 50 located on the exterior of the housing 11.

In accordance with the present invention, rectifiers 51 and a voltage regulator 52 may be connected to the leads of the stator windings 35, with the output terminals 50 being thereafter electrically connected to the rectifiers 51 and the voltage regulator 52 so that the alternating voltage generated by the alternator 10 can be converted to direct current so as to be delivered as direct current to provide a source of electric power at a predetermined voltage. The rectifiers 51 and the voltage regulator 52 are mounted within the non-magnetic housing section 12 and are carried by a plurality of arcuate skeletonized plates. (The skeletonization of the plate associated with the voltage regulator 52 is not shown.) The plurality of arcuate skeletonized plates are respectively secured to the housing section 12 and comprise a segmental skeletonized radial housing wall 53 encircling the hub 18.

The radial partition 19 is likewise segmental, the partition 19 comprising a plurality of arcuate partition segments, each of which includes a plurality of elongated slots or openings 55 (FIG. 4) therethrough. The openings 55 through the segmental partition wall 19 cooperate with the multiple openings in the segmental skeletonized housing wall 53 and a plurality of circumferentially arranged elongated slots or openings 56 formed in the radially outwardly disposed portion of the housing section 13 to provide effective ventilation of the alternator housing 11.

Ventilation of the alternator housing 11 effecting cooling of the alternator 10 is enhanced by a fan 60 which is mounted on the shaft 14 for rotation therewith. The fan 60 is disposed between the sheave 15 and the bearing assembly 17 and includes radial blades 61 extending within the housing section 12. The fan blades 61 are arranged in substantial axial alinement with the multiple openings in the segmental skeletonized housing wall 53, the openings 55 in the segmental radial partition 19, and the openings 56 in the housing section 13 so as to direct a continuous flow of air through the alternator housing 11 when the alternator 10 is in operation with the shaft 14 and the fan 60 carried thereby undergoing rotation. The air flow through the alternator housing 11 exerts a cooling influence on the alternator 10 to prevent over-heating.

The rotor member 20 may be readily skewed in a well known manner to reduce the audible noise accompanying the rotation of a rotor member in the operation of a dynamoelectric machine to an unobjectionable level.

The embodiment of the invention which has been described and shown herein is by way of example, but should not be construed as necessarily limitative of the scope of the invention since various modifications may be made by those skilled in the art without departing from the scope of the invention as defined by the appended claim.

I claim:

A rotor member for use in a dynamoelectric machine comprising a magnetic disc having a plurality of circumferentially spaced radially outwardly extending projections, an annular magnetic rim extending about said disc in radially spaced relation thereto and having a plurality of spaced radially inwardly extending projections respectively received in spaced relationship between adjacent radially outwardly extending projections on said disc, a plurality of non-magnetic spacer members extending between said disc and said rim connecting said disc and said rim together in radially spaced relationship, said non-magnetic spacer members occupying only a minor portion of the space existing between said disc and said rim so as to define therewith a unitary construction for the rotor member provided with voids therein between said disc and said rim thereof, said radially outwardly extending projections on said disc comprising magnetic poles of one magnetic polarity, said radially inwardly extending projections on said rim comprising magnetic poles of the opposite magnetic polarity, said disc and said rim respectively comprising a plurality of laminations, each of said laminations comprising a flat substantially planar plate, the laminar portions of the plurality of respective laminations comprising said disc and said rim which define each of said magnetic poles being of stepped configuration having progressively increasing radial length, and the direction in which the laminar portions defining the magnetic poles on said disc are progressively stepped in radial length being reversed from the direction in which the laminar portions defining the magnetic poles on said rim are progressively stepped in radial length.

References Cited

UNITED STATES PATENTS

| 2,243,318 | 5/1941 | Rawlings | 310—254 |
|-----------|--------|----------|---------|
| 2,928,963 | 3/1960 | Bertsche et al. | 310—168 |
| 3,223,866 | 12/1965 | Tiltins | 310—168 |
| 3,261,998 | 7/1966 | Bosco et al. | 310—168 |

MILTON O. HIRSHFIELD, *Primary Examiner.*

L. L. SMITH, *Assistant Examiner.*